July 19, 1960    R. E. SMITH    2,945,237
GEARED PLIERS
Filed May 11, 1959

*INVENTOR.*
Randall E. Smith
BY *Irving Seidman*
ATTORNEY

United States Patent Office 2,945,237
Patented July 19, 1960

2,945,237
GEARED PLIERS

Randall E. Smith, 703 Belmont Road, Ridgewood, N.J.

Filed May 11, 1959, Ser. No. 812,346

2 Claims. (Cl. 1—220)

This invention relates to pliers and, more particularly, to a novel pliers construction particularly adaptable for positioning and closing clips securing seat covers to automobile seats.

In applying covers to automobile seats, and particularly in the case of custom fitted covers, the covering material is draped over the upper surface of the seat, drawn down over the front, back and side edges of the seat, turned underneath the bottom edges of the seat, and then clipped to the interior of the seat to hold the material smoothly and tightly over the outer surfaces of the seat. The clipping is effected by means of "hog" rings or clips and, to position and close these clips, the installer must reach beneath the seat, position the ring or clip, and close the ring or clip with a pair of pliers.

When the seats are located a reasonable distance above the floor, as in the case of older cars, no particular difficulty is encountered in installing the seat covers in the foregoing manner. Any minor inconvenience is due to the fact that the pliers, held beneath the seat, must be directed toward the outside of the seat, which makes the manipulation of the pliers a little more difficult but not impossible so long as the installer can extend his arm beneath the seat.

However, with the trend toward lower cars, and particularly lower roofs, in order to obtain adequate head room, the seats have been moved down so that there is no longer sufficient clearance between the car floor and the lower edge of the seat for an installer to extend his arm under the seat. Consequently, it is difficult, if not impossible, to clip the seat covers to the inside surface of the seat.

In accordance with the invention, these difficulties are obviated by a novel pliers construction including a pair of jaws opening toward the handle end of the pliers and remotely operated by independently pivoted handle means. These jaws are recessed or grooved to seat and retain a clip for positioning inside the seat, after which the handle is operated to first converge the jaws to close the clip on the fabric and then to diverge the jaws to release the clip.

More particularly, the jaws include one adjustable but relatively fixed jaw and a cooperating movable jaw pivoted at the end of the pliers. This movable jaw has gear teeth meshing with a rack bar slidable along the channel shape body of the pliers. The jaws are juxtaposed but have offset outer ends so that the active parts of the jaws are aligned. The fixed jaw has angularly related seating surfaces on its inner end which may be respectively engaged with a fixed bar jutaxposed with the slidable rack bar.

At the other end of the pliers is a fixed handle preferably integral with the pliers body, and juxtaposed with the fixed handle is a pivoted handle whose hub has gear teeth meshing with the rack bar. Consequently, pivoting of the movable handle slides the rack bar to pivot the movable jaw.

Adjustment of the fixed jaw is effected by partly withdrawing a pivot both extending through both jaws, resetting the fixed jaw, and then re-inserting and tightening the bolt.

For an understanding of the invention principles, reference is made to the following description of a typical embodiment thereof as illustrated in the accompanying drawing.

Figure 1:
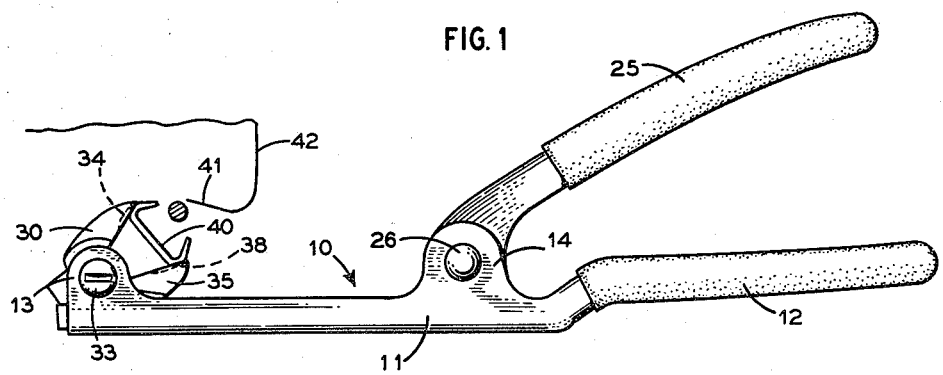
Fig. 1 is a side elevation view of the pliers as used in closing a clip onto the inside surface of a car seat.

Referring to the drawings, the pliers 10 comprises a relatively elongated upwardly opening channel element 11 offset at one end to receive a relatively stationary handle 12. The flanges of channel element 11 are formed with a pair of apertured ears 13 at the jaw end of the pliers and a second pair of apertured ears 14 adjacent handle 12.

Figure 3:
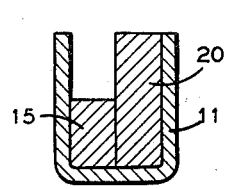
Fig. 3 is a sectional view on the line 3—3 of Fig. 2.

As best seen in Fig. 3, a pair of relatively elongated bars 15 and 20, of rectangular cross-section, are disposed in juxtaposed relation along channel element 11. Bar 15 is relatively fixed whereas bar 20 is slidable along element 11 and its upper surface is formed with rack teeth 21 adjacent ears 14 and rack teeth 22 adjacent ears 13.

Teeth 21 mesh with teeth 23 on the hub 24 of a movable handle 25 pivoted on a pin, bolt, or rivet 26 extending through ears 14. Teeth 22 mesh with teeth 31 on the hub 32 of a movable jaw 30 pivoted, in juxtaposed relation to a stationary jaw 35, on a bolt 33 extending through ears 13.

Figure 4:
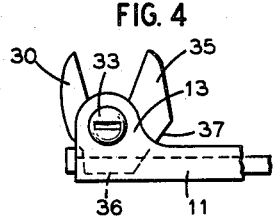
Figs. 4 and 5 are partial side elevation views of the pliers illustrating the two positions of the stationary jaw.
Figure 5:
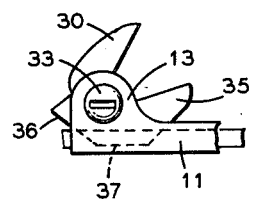
Figure 6:
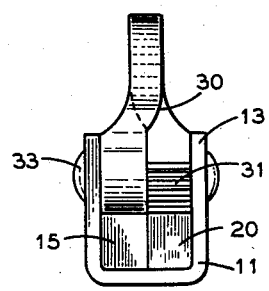
Fig. 6 is an elevation view of the jaw end of the pliers.

Jaw 35 has angularly related flat surfaces 36, 37 selectively engageable with the upper surface of bar 15 to adjust the angle of jaw 35. Such adjustment is effected by withdrawing bolt 33 sufficiently to release jaw 35, repositioning jaw 35, and re-inserting bolt 33 therethrough. The two positions are shown in Figs. 4 and 5.

Figure 2:
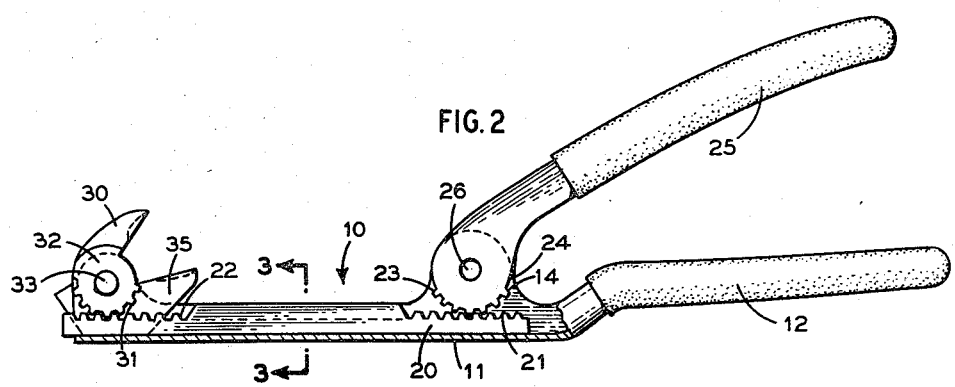
Fig. 2 is a longitudinal central sectional view of the pliers.

Jaws 30 and 35 have recesses 34 and 38, respectively, to seat opposite ends of a clip 40. With the clip positioned in the jaws, the latter opening generally toward the handle end of the pliers, the pliers 10 are inserted beneath the lower edge 41 of a seat 42. By moving handle 25 toward handle 12, bar 20 is advanced to rotate jaw 30 toward jaw 35 to close clip 40 on the seat material and seat cover. The position of fixed jaw 35 is that of Figs. 1, 2 and 4. To secure clip 40 to a horizontal interior surface of the seat, jaw 35 is positioned as shown in Fig. 5.

While a specific embodiment of the invention has been shown and described in detail to illustrate the application of the invention principles, it will be understood that the invention may be embodied otherwise without departing from such principles.

What is claimed is:

1. A pliers comprising, in combination, a relatively elongated channel-shape body having a pair of aligned apertured ears projecting from its flanges at each end of the body; a rack bar slidable along said body; first and second jaws having apertured hub portions receiving pivot means in the aligned apertures of the ears at one end of the body, the first jaw being relatively stationary and the second jaw being relatively movable and having a hub portion formed with gear teeth meshing with said rack bar; a relatively stationary first handle extending from the other end of said body; a relatively movable second handle pivoted on pivot means in the apertured ears at said other end of said body for coaction with said first handle and having a hub portion formed with gear teeth meshing with said rack bar; whereby movement of said second handle will effect corresponding movement of said second jaw; and a second bar juxtaposed in said body with said rack bar, said first jaw having angularly related flat surfaces on its hub portion selectively positionable against said second bar.

2. A pliers as claimed in claim 1 in which said first jaw is selectively positioned angularly relative to said second jaw by withdrawing said pivot means from said first jaw, positioning a selected flat surface against said second bar, and re-inserting said pivot means.

References Cited in the file of this patent

UNITED STATES PATENTS

| | | |
|---|---|---|
| 58,326 | Waters | Sept. 25, 1866 |
| 474,696 | Samsel | May 10, 1892 |
| 723,629 | Wiles | Mar. 24, 1903 |
| 2,312,766 | Merki | Mar. 2, 1943 |
| 2,511,795 | Cote | June 13, 1950 |
| 2,562,097 | Heuer | July 24, 1951 |
| 2,587,096 | Berger | Feb. 26, 1952 |
| 2,827,694 | Trippler | Mar. 25, 1958 |